United States Patent [19]

Bassett et al.

[11] Patent Number: 4,769,976
[45] Date of Patent: Sep. 13, 1988

[54] METHOD AND APPARATUS FOR SUPPORTING A REEL UNIT

[75] Inventors: James H. Bassett, St. Paul; James R. Flaskerud, Plymouth; Malachy Fay, Eden Prairie, all of Minn.

[73] Assignee: The Toro Company, Minneapolis, Minn.

[21] Appl. No.: 13,316

[22] Filed: Feb. 11, 1987

[51] Int. Cl.⁴ ..................... A01D 34/53; A01D 75/30
[52] U.S. Cl. ........................................... 56/7; 56/249
[58] Field of Search ..................... 56/6, 7, 13.6, 192, 56/249-254, 208, 209

[56] References Cited

U.S. PATENT DOCUMENTS

| | | | |
|---|---|---|---|
| 1,556,965 | 10/1925 | Seeley | 56/7 |
| 1,654,568 | 1/1928 | Worthington | 56/7 |
| 2,067,158 | 1/1937 | Moyer | 56/7 |
| 2,099,902 | 11/1937 | Moyer et al. | 56/7 |
| 2,130,116 | 9/1938 | Blydenburgh | 56/7 |
| 2,283,269 | 5/1942 | Krenzke | 56/7 |
| 2,299,859 | 10/1942 | Speiser | 56/7 |
| 2,325,252 | 7/1943 | Krenzke | 56/7 |
| 2,475,671 | 7/1949 | McCartney | 56/7 |
| 2,505,878 | 5/1950 | Blydenburgh | 56/16.6 |
| 2,525,047 | 10/1950 | Sawtelle et al. | 56/7 |
| 2,936,561 | 5/1960 | Grimes | 56/7 |
| 3,038,286 | 6/1962 | Hall | 56/7 |
| 3,058,281 | 10/1962 | Lewis | 56/7 |
| 3,410,063 | 11/1968 | Speiser | 56/7 |
| 3,514,926 | 6/1970 | Heth et al. | 56/7 |
| 3,559,385 | 2/1971 | Eaton | 56/16.6 |
| 3,613,337 | 10/1971 | Akgulian et al. | 56/7 |
| 3,616,626 | 11/1971 | Bramley et al. | 56/7 |
| 3,668,844 | 6/1972 | Akgulian et al. | 56/7 |
| 3,742,685 | 7/1973 | Lian et al. | 56/7 |
| 3,816,985 | 6/1974 | Sorenson et al. | 56/7 |
| 3,832,835 | 9/1974 | Hall et al. | 56/7 |
| 3,910,016 | 10/1975 | Saiia et al. | 56/7 |
| 3,918,239 | 11/1975 | Aldred et al. | 56/7 |
| 3,968,630 | 7/1976 | Mitchell | 56/7 |
| 3,983,683 | 10/1976 | James | 56/364 |
| 4,021,996 | 5/1977 | Bartlett et al. | 56/7 |
| 4,127,981 | 12/1978 | Parrish et al. | 56/14.4 |
| 4,137,696 | 2/1979 | Webb | 56/208 |
| 4,161,858 | 7/1979 | Gerrits | 56/7 |
| 4,174,602 | 11/1979 | Webb et al. | 56/208 |
| 4,174,603 | 11/1979 | Parrish | 56/208 |
| 4,316,356 | 2/1982 | Planeta | 56/16.2 |
| 4,325,211 | 4/1982 | Witt et al. | 56/15.8 |
| 4,330,981 | 5/1982 | Hall et al. | 56/7 |
| 4,370,846 | 2/1983 | Arnold | 56/6 |
| 4,478,026 | 10/1984 | Mullett et al. | 56/7 |
| 4,589,249 | 5/1986 | Walker et al. | 56/16.6 |

OTHER PUBLICATIONS

Jacobsen Leaflet on HF-5 Mower Pub. No. T0135-2.
Ransomes Grass Machinery, Pub. No. 23181G.
Toro Brochure: Once Again, We Have Our Competition Seeing Red, Form 87-177-T.
Ransomes Brochure on 350D Mower Pub. No. 23135H.
John Deere Hydraulic Reel Mowers, Pub. No. E-34-69-87-1.
Turf Blazer 727 Brochure from Howard Price Turf Equipment.
John Deere Golf and Turf Equipment, Pub. No. E-34-60-86-9.
Deltawing X-Tra Life Universal Joints for Heavy-Duty Trucks & Off-Highway Vehicles, Pub. No. SP-7930.

Primary Examiner—John Weiss
Attorney, Agent, or Firm—R. Lawrence Buckley

[57] ABSTRACT

A U-joint (23) for connecting a reel unit (22) to a lift arm (18) of a turf maintenance machine (10). U-joint (23) preferably includes a pivot arm (40) suitable for connection to the lift arm (18), and a pivot base (38) for connection to the top of a standard reel cutting unit (22). Situated between pivot arm (40) and pivot base (38) is a cross and bearing unit (72). Pitch stops are formed by the base (38) whereas roll stops are formed by the pivot arm (40). The stops act on the cross and bearing unit (72) to provide limited pitching and rolling of reel unit (22) relative to lift arm (18).

6 Claims, 3 Drawing Sheets

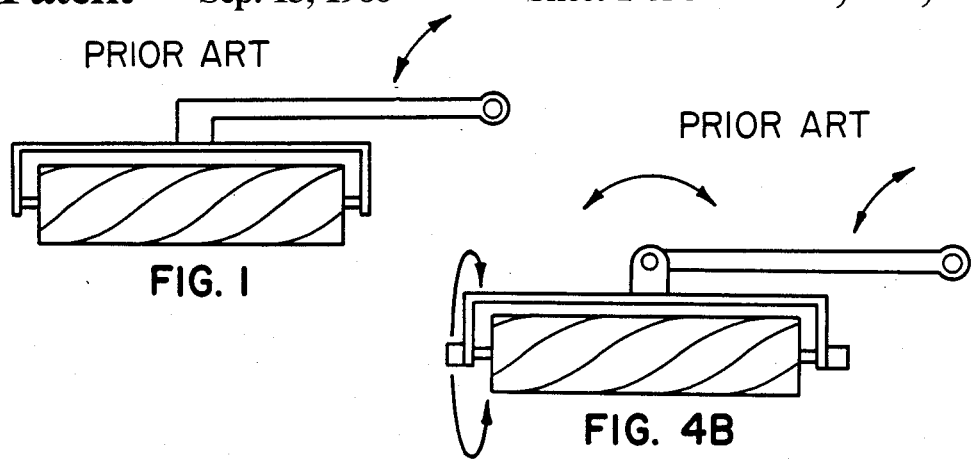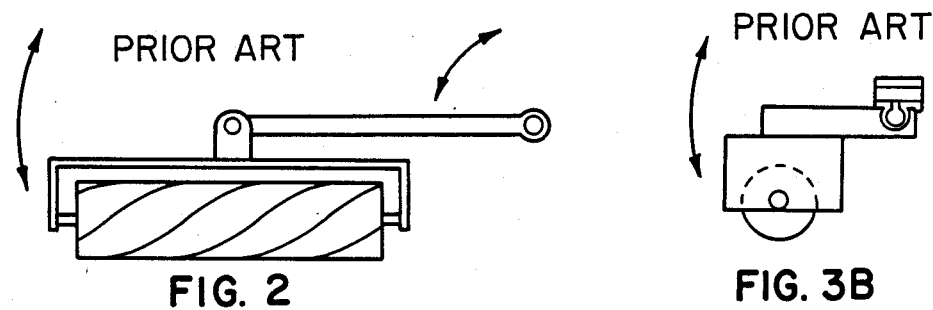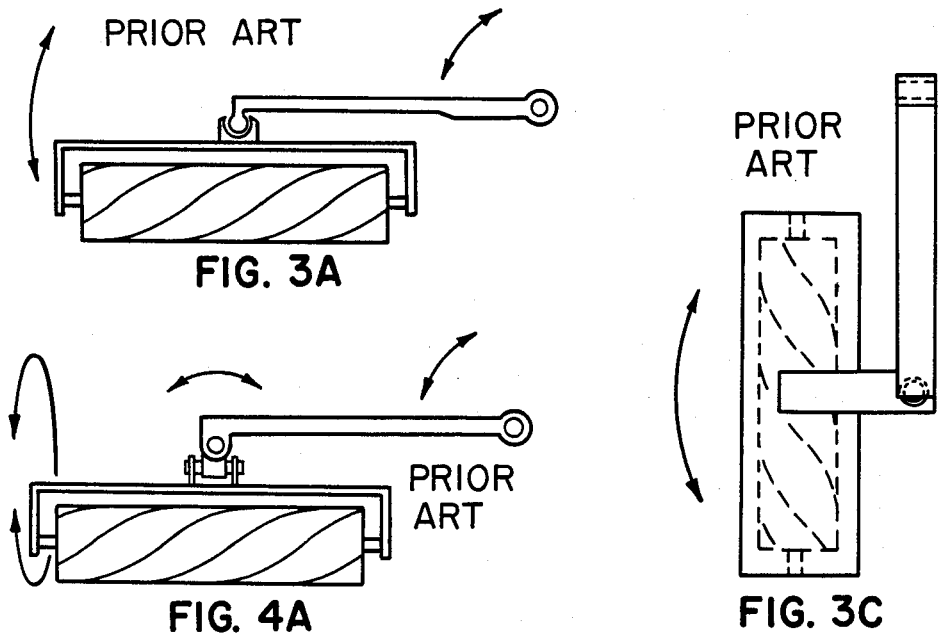

METHOD AND APPARATUS FOR SUPPORTING A REEL UNIT

TECHNICAL FIELD

The invention relates generally to turf maintenance equipment, and more particularly to methods and apparatus for "float" mounting the cutting reel units of power turf mowing equipment.

BACKGROUND OF THE INVENTION

Many types of power turf mowing equipment are known. Such equipment can be classified into those mowers which include a rotary cutting unit(s) and those which include reel cutting unit(s). A rotary cutting unit usually includes one or more rigid steel blades rotated within a housing in horizontal cutting planes to sever grass or other vegetation at a predetermined height above the ground. Turf mowers having rotary cutting units are often referred to as rotary mowers since the blades revolve in a rotary fashion within the cutting unit.

A reel cutting unit, on the other hand, typically includes a frame within which is horizontally rotatably mounted a reel possessing a plurality of arcuate blades. The rotating reel blades pass in close proximity to a bedknife which spans the cutting unit frame parallel to the reel axis. Grass blades are sheared at the reel blade/bedknife interface.

While rotary cutting units are generally suitable for most purposes, it is generally perceived that reel units provide a higher quality cut. Also, it is fairly easy to arrange a plurality (typically three, five or seven of reel cutting units into a "gang" capable of cutting a very wide swath each pass. In turf mowing machines of the type known as gang mowers, several cutting units are held in spaced positions in transverse rows of one or more units so that their swaths overlap and so that the units are individually free to adapt themselves to the undulations of the ground.

Power turf mowing equipment can also be categorized based on the method of propelling the cutting units. Generally, there are walk-behind; riding; and towed cutting unit mowers. The present invention relates to the latter two types; walk-behind mowers are usually found in residential settings, and the present invention does not pertain to such mowers.

Larger riding mowers typically include a traction vehicle supported by a plurality of wheels; a prime mover connected through a transmission to one or more of the wheels; one or more cutting units connected through a power take-off (PTO) to the prime mower; and one or more lift arms (or analogous structures) pivotally connected to the traction vehicle suitable for supporting the cutting unit(s).

Towed cutting units would normally include a towable frame suitable for connecting to a tractor or other traction vehicle. Suspended from the towable frame would usually be several cutting units, the power for the cutting units being derived either from a PTO or the traction vehicle's prime mover; a separate prime mover mounted on the towable frame; or from frictional engagement with the ground as the cutting units are pulled along.

The present invention relates to riding mowers and towable mowing frames having reel cutting units. As is well known, another reel-like unit is used to produce a "verticut," and this type of cutting unit is also contemplated. For the sake of brevity, the invention will hereafter be discussed in terms of large commercial riding mowers.

Experience has shown that it is very advantageous to connect the reel units to the traction vehicle such that they can "float" relative to the traction vehicle. A "floating" reel unit can follow the contours or undulations of the ground irrespective of the gross motion of the traction vehicle. If reel units are not supported in a floating manner, they tend to scalp the higher regions and miss the lower regions. While non-floating cutting reels might be acceptable for residential use, certainly golf course and estate maintenance require that the cutting units individually follow the subtle variations of the ground to maintain a consistently good cut across the entire swath, regardless of the immediate topography encountered by each individual reel unit.

In this type of mower each reel unit is independently and separately pivotally supported by the traction vehicle, and each reel unit is typically driven by a mechanical or hydraulic drive extending from the traction unit to the reel unit. An example of this type of mowing machine is the 350D mower sold by the Toro Company, assignee herein.

The method by which the reel units are attached to the traction vehicle is important not only because the reel units must float to provide a quality cut, but also for other reasons. For example, the connection between the reel units and the traction vehicle must permit, if not assist, lifting of the reel units from their operative positions to their transport positions. The operator might want to temporarily raise one or more of the cutting units to mow a narrower swath or to pass through a gate or between trees. Also, it is occasionally necessary to drive the mowing machines over conventional road surfaces, at which time it is important to raise the cutting units to a transport position since they are not entirely suitable for repeatedly running up and down over curbs, nor for travel over paved streets at anything approaching the speed of ordinary city traffic. In view of this, most riding mowers, such as the one described in U.S. Pat. No. 2,299,859, include mechanisms which can raise the cutting units upward and toward the traction vehicle into a substantially vertical orientation.

When a reel unit is in its raised or transport position, it must be held there very securely. Otherwise, it may tend to swing and thereby cause personal injury or damage to the mower. Also, if the connection between the traction vehicle and the reel units is inadequate, when the reel units are lowered they may contact the ground in a tilted or skewed state, and this can cause a hole or undesirable compaction in the ground.

The means for supporting the reel units must therefore allow for limited floating of the reel units; permit controlled lifting of the reel units for transportation purposes; and precisely hold the reel units in their raised or transport position. The joint or connection means between the cutting units and the traction vehicle must also be quite rugged; simple and easy to maintain; relatively inexpensive; and relatively light (so as not to overburden the traction vehicle).

Against the background of the afore-mentioned criteria, various reel unit support methods have been suggested. These support techniques can be generally categorized according to the number of degrees of freedom which they afford the cutting units. FIGS. 1–4 show various prior art reel unit supporting systems. It should be noted that FIGS. 1–4 are not intended to represent structures which are precisely found in the prior art, but are instead provided to illustrate prior art reel support concepts. For example, the structure shown in U.S. Pat. No. 1,556,965 allows for vertical displacement and "yaw" whereas FIG. 2 shows very diagrammatically a structure which allows for vertical displacement and "roll" of a cutting unit, but both systems may be termed "two-degree-of-freedom" support techniques in that they allow the reel to move in two distinct and independent ways relative to the traction vehicle or support frame. The terms "roll" and "yaw" are defined below. As another example, the structure shown in FIG. 1 is meant to represent systems such as the one depicted in U.S. Pat. No. 2,525,047. The system shown in this patent includes reel units which have only one-degree-of-freedom, namely "roll" with respect to a towed frame. Similarly, FIG. 3 is provided simply to help categorize the prior art, and no representation is made that the diagrammatic structure shown in FIG. 3 is actually found in its entirety in prior art structures. In fact, ball joints in combination with a "lift arm" per se may not be found at all in the prior art. The labels "Prior Art" on FIGS. 1–4 are attached only to distinguish these figures from FIGS. 5–8 which show the present invention.

FIG. 1 illustrates a very simple prior art support concept wherein a reel unit is rigidly attached to a lift arm or the like which in turn is pivotally connected to a traction vehicle. A structure employing this concept is shown in U.S. Pat. No. 2,525,047, as noted above. This system allows only "rolling" (to borrow a term from the aviation field) of a cutting unit relative to the main traction vehicle, and it can be termed a "one-degree-of-freedom" method since the cutting unit can only move pivotally in one direction. While this mounting scheme is inexpensive and lends itself to easily and securely raising the cutting units to their transport positions, it is clearly disadvantageous from the standpoint of allowing the cutting units to follow the contours of the ground independent of the traction vehicle.

FIG. 2 diagrammatically illustrates a simple "two-degree-of-freedom" reel unit supporting technique. Here, as was the case with the one-degree-of-freedom system discussed above, the reel unit can move or pivot vertically relative to the traction vehicle. In addition, the reel unit of the FIG. 2 system can tip from side-to-side relative to the lift arm, there usually being a simple bushing or the like at their connection point. An example of this type of system is shown and described in U.S. Pat. No. 3,613,337. This technique allows for vertical displacement and "roll" of the cutting unit, again borrowing terminology from the aviation field to describe the motion of the cutting unit. Thus, the cutting units can roll to follow subtle ground undulations.

The system shown in FIG. 2 is also desirable from the standpoint that the cutting units can be securely lifted to a transport position. The joint between the lift arm and the reel unit allows for only limited motion of the reel unit, which means that the reel unit is quite controllable and predictable during the raising and lowering sequences.

Although the two-degree-of-freedom system shown in FIG. 2 is theoretically superior to the one-degree-of-freedom system shown in FIG. 1 in that it allows the cutting unit to more closely follow the undulations of the ground, this technique still does not allow for "pitching" (as in the pitching forward or rearward of an airplane) of the reel unit.

In view of the desirability of still greater floating action (i.e., "pitch") of cutting units relative to the lift arms, ball-and-socket joints have been proposed for use between lift arms (or the like) and cutting units. Ball joints, as is well known, allow almost unlimited rotary or spherical motion, and therefore would seem to offer a simple solution to the floating problem. FIGS. 4A, 4B and 4C show a few of many degrees of freedom allowed by a ball joint between a lift arm and a cutting unit. As shown, ball joints allow for vertical displacement (FIG. 3A), "pitch" (FIG. 3B), "roll" (FIG. 3A) and "yaw" (FIG. 3C). While it might seem, at first glance, desirable to allow for yaw of a cutting reel unit, the present Applicants have found that yaw is generally unnecessary and in fact should often be avoided in the context of riding mowers, for several reasons. For one thing, it is desirable to have a single lift arm or the like connected to a reel unit which can propel the reel unit and also selectively lift the reel unit. If yaw is allowed, there must generally be two separate pull and pick up devices or arms. The assignee herein markets a power turf maintenance apparatus under the designation PARKMASTER ® which includes separate pull and pick up mechanisms, and although the system works well, it is perceived that it can be improved upon.

Also, if reel units are allowed to yaw, the inner cutting units may strike their respective lift arms during a sharp turn. Of course, stops could be built into the system to prevent this from happening, but it presents an unnecessary complication nonetheless.

Finally, if reel units can yaw relative to their traction vehicle, it is more difficult to tilt them upwards during the reel lifting operation. Reel units usually include a tipper bracket or the like which strikes a roller mounted on the traction vehicle to tilt the reel unit vertically as the lift arm pivots upward. If the reel units were allowed to yaw, the tipper brackets and/or rollers would have to be considerably wider to account for the fact that the reel units could be "yawed" to either extreme at the commencement of the lifting sequence.

Whether or not reel unit yawing is deemed desirable, ball joints between lift arms and cutting units are generally unsatisfactory: (i) ball joints do not include roller-type bearings, i.e., ball bearings or needle bearings; (ii) they are not adequately sealed; (iii) they are generally not rugged enough for this application; and (iv) it would be difficult to "lock out" or prevent pitching of the cutting units when necessary. In a dethatching operation, for example, it is desirable to allow rolling of the reel unit while preventing reel unit pitching.

Moreover, the use of ball joints between the reel units and the traction vehicle also usually necessitates use of additional stabilizer links to eliminate some of the freedom of motion afforded by the ball joints. Reference is made to U.S. Pat. Nos. 2,505,878 and 2,475,671 which show such situations.

Still another support technique for a reel unit can be termed a "three-degree-of-freedom" scheme. FIG. 4 diagrammatically shows two three-degree-of-freedom systems. FIG. 4A shows a simple "stacked bushing" technique wherein two orthogonal bushings are in effect stacked to provide pitch and roll. This type of system is evident in the Ransomes' mower Model No. 350D, shown in their Publication No. 23135H. A conceptually similar design is shown in FIG. 4B, but in this case there are actually three bushings: a central upper bushing permits roll of the cutting unit whereas two axially-aligned end bushings connected to the side plates of the reel unit allow for pitching of the reel unit relative to the lift arm. The Toro Company, the assignee herein, sells a REELMASTER ® 216 mower which has this type of reel unit suspension. While the designs shown in FIGS. 4A and 4B are advantageous in that they eliminate bothersome yaw, as a class they each have theoretical disadvantages. For the stacked bushing design diagrammatically shown in FIG. 4A, the roll bushing is displaced from the reel center line to such an extent that a fairly long moment arm is created between the roll bushing and the center line of the cutting reel sufficient to create a significant twisting moment on the lift arm during normal operation and when obstructions are encountered. Further, with this design it is somewhat cumbersome to lock out reel pitching. As shown in the Ransomes brochure referred to above, the roll bushing pivots within a U-shaped bracket mounted to the reel unit frame. To lock out pitch of the reel, the roll bushing must be somehow rigidly connected to the U-bracket.

The type of system shown in FIG. 4B also has disadvantages, the obvious one being that there are three bushings to maintain. Bushings, as a class, are notoriously sensitive to sand and grit, substances found in abundance on golf courses and the like. Also, many bushings are simply not well suited for the very heavy loads to which reel cutting units on commercial turf maintenance machines are subjected. Further, many bushing joints are not sufficiently smooth or friction-free to allow for free floating of reel units. If binding of a reel unit occurs when it is lowered from the transport position to the operation position, the cutting unit can potentially cause an undesirable hole or compaction in the turf.

The present invention addresses the problems possessed by prior art reel unit suspension systems. In particular, the present invention includes a three-degree-of-freedom reel supporting system which allows for adequate "floating" of the reel unit; accommodates existing reel unit lifting techniques; and is rugged, inexpensive, and compact.

SUMMARY OF THE INVENTION

Accordingly, in broad terms the invention includes a turf maintenance apparatus including a traction unit moveable over the ground in a longitudinal direction; a reel unit; a lift arm pivotally connected to the traction unit; and a U-joint coupling between the reel unit and the lift arm suitable for allowing limited pitch and roll of the reel unit relative to the lift arm, while not allowing yaw relative to the lift arm.

The invention is particularly directed toward a U-joint coupling suitable for connecting a reel unit to its associated lift arm.

Additional features of the invention are described herein.

BRIEF DESCRIPTION OF THE DRAWINGS

The invention will be further described with reference to the Drawings, wherein:

FIG. 1 is a diagrammatic front elevational view of a hypothetical one-degree-of-freedom reel unit support system;

FIG. 2 is a diagrammatic front elevational view of a prior art two-degree-of-freedom reel unit support system;

FIG. 3A is a diagrammatic front elevational view of a reel unit supporting apparatus including a ball joint between the lift arm and the reel unit;

FIG. 3B is a diagrammatic side elevational view of the reel unit support apparatus shown in FIG. 3A;

FIG. 3C is a top plan view of the system of FIG. 3A;

FIG. 4A is a diagrammatic front elevational view of a three-degree-of-freedom reel unit apparatus including stacked roll and pitch bushings;

FIG. 4B is a diagrammatic front elevational view of another prior art three-degree-of-freedon reel unit apparatus having a central roll bushing and a pair of end pitch bushings;

DETAILED DESCRIPTION OF THE INVENTION

Figure 5:
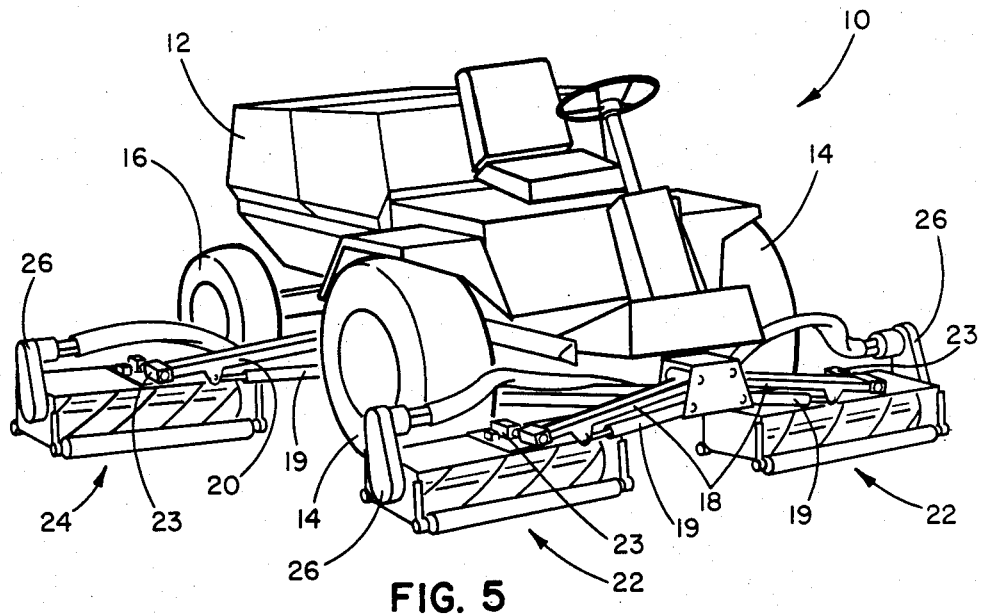
FIG. 5 is a perspective view of a turf maintenance machine according to the invention.

Referring to the Drawings, wherein like reference numerals designate like parts and assemblies throughout the several views, FIG. 5 shows a perspective view of a preferred turf maintenance machine 10 according to the invention. Machine 10 includes a traction vehicle 12 supported by a pair of front drive wheels 14 appropriately coupled through a transmission (not shown) to a prime mover (also not shown). A pair of rear steerable wheels 16 support the rearward end of vehicle 12.

Turf maintenance machine 10 can be used in a variety of turf maintenance capacities, e.g., mowing and dethatching. Hydraulically-powered tools are operatively connected to vehicle 12 for these purposes. A pair of front tool-supporting lift arms 18 are hingedly connected to the front central portion of vehicle 12. Similarly, a pair of side tool-supporting lift arms 20 are hingedly connected to vehicle 12 proximate its longitudinal mid-point and extend laterally therefrom. A reel unit 22 is coupled to each front lift arm 18 through a unique U-joint connection 23 which permits reel units 22 to individually follow ground undulations. A side reel unit 24 is coupled to each side lift arm 20, also through the use of U-joint 23. The present invention is particularly directed toward the lift arm/reel unit joint, and preferred joint 23 will be further described below.

A center reel (not shown) located centrally between wheel 14 and 16 is included to cut the strip of grass left between front reels 22 and to cut a swath which overlaps the swaths created by front reels 22. Associated with each lift arm 18, 20 and with the center reel unit is a hydraulic cylinder 19 capable of lifting the reel unit from its operating position to its transport position. Reel units 22, 24 are shown in their operating positions in the Drawings, but those skilled in the art will recognize that U-joints 23 will allow the reel units to be selectively raised for transportation purposes and to permit the operator to mow a narrower swath, for example.

Figure 6:
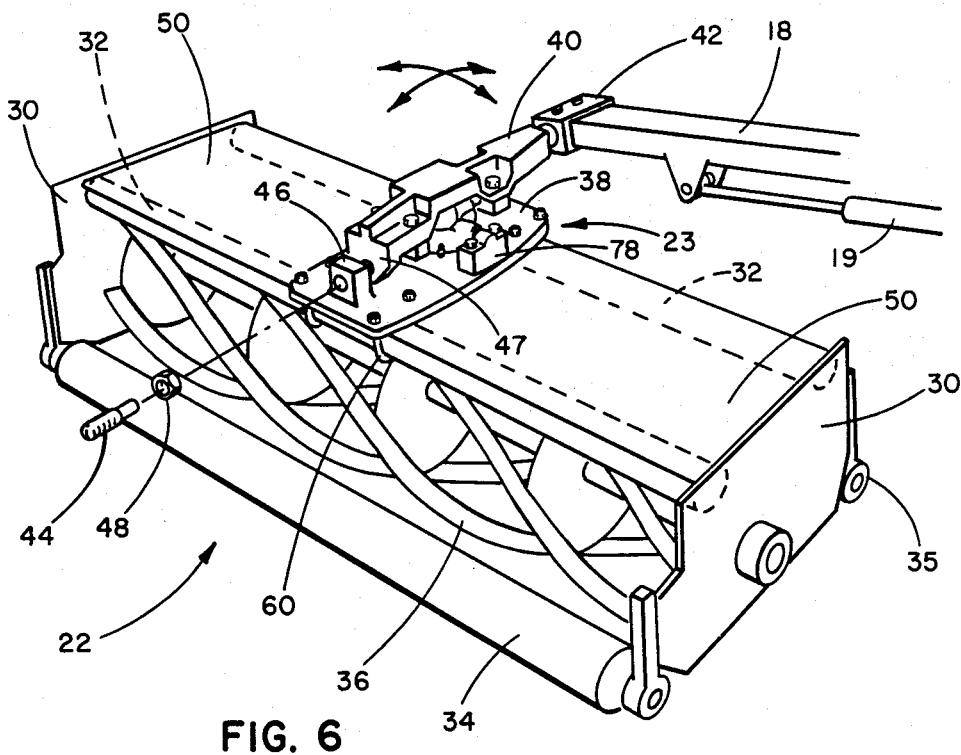
FIG. 6 is an enlarged perspective view of a reel unit connected to a lift arm in accordance with the invention.

An enlarged perspective view of the left front reel unit 22, its associated lift arm 18 and U-joint 23 is shown in FIG. 6. Although the particular construction of the reel unit 22 shown in FIG. 6 is not central to the invention, the basic components of reel unit 22 will be described. A pair of substantially square side plates 30 are located at opposite ends of the reel unit 22. Plates 30 are spanned at the top by a pair of steel tubes 32 and at the bottom by a rear roller 34 and a front roller 35. Also spanning the end plates 30 is a horizontally centrally mounted rotatable reel 36 which is coupled to the associated hydraulic motor 26 (which has been omitted from FIG. 6 for the sake of clarity). Thus, reel unit 22 is a substantially self-supporting unit which traverses the ground on rollers 34 and 35 and which is powered through a hydraulic connection with the traction vehicle 12. A bedknife (not shown) also spans between end plates 30 and is situated proximate the lower outer periphery of reel 36 so that when reel 36 spins its blades come into close proximity to the bedknife to shear the grass blades.

U-joint 23 is also shown in FIG. 6. Joint 23 includes as its basic components a pivot base 38 bolted to reel unit 22; and a pivot arm 40 which is pivotally joined to pivot base 38 in U-joint fashion, as further described below. Pivot arm 40 is a substantially elongate steel forging whereas pivot base 38, not requiring the strength of pivot arm 40, is a steel casting. A grip block 42 at the end of lift arm 18 receives a cylindrical pivot arm extension 64 (see FIGS. 7 and 8) which extends from a pivot arm body 66 which comprises the remaining portion of pivot arm 40. Grip block 42 and pivot arm extension 64 are bolted together using conventional threaded fasteners.

Pivot base 38 can pivot in two directions (forward and backward, or pitch, and side-to-side, or roll) relative to lift arm 18, as indicated by the arrows in FIG. 6. As well known to those in the field of turf maintenance, it is sometimes, e.g., while doing dethatching, desirable to eliminate the pitching motion of a reel unit relative to its lift arm. In view of this, joint 23 includes means for locking out the pitching motion of the reel unit 22. Such means includes an internally threaded block 46 extending upward from and integral with pivot base casting 38 which is bolted to reel unit 22. Block 46 receives a lock pin 44 which is threaded along only a portion of its length, the unthreaded portion of which can be selectively inserted within an unthreaded block 47 extending downward from pivot arm body 66 of pivot arm 40. A lock pin jam nut 48 is used to hold lock pin 44 in the selected position. Thus, when it is desirable to allow roll and pitch of reel unit 22 relative to lift arm 18, lock pin 44 is withdrawn from pivot lock pin block 47 and locked in this position by jam nut 48. When it is desirable to eliminate the pitching motion of the reel unit 22 relative to arm 18, it is simply necessary to loosen jam nut 48 and rotate lock pin 44 clockwise to advance it into pin block 47 on pivot arm 40. Once lock pin 44 is so positioned, jam nut 48 is again tightened against pin block 47 to secure the assembly in this state.

Figure 7:
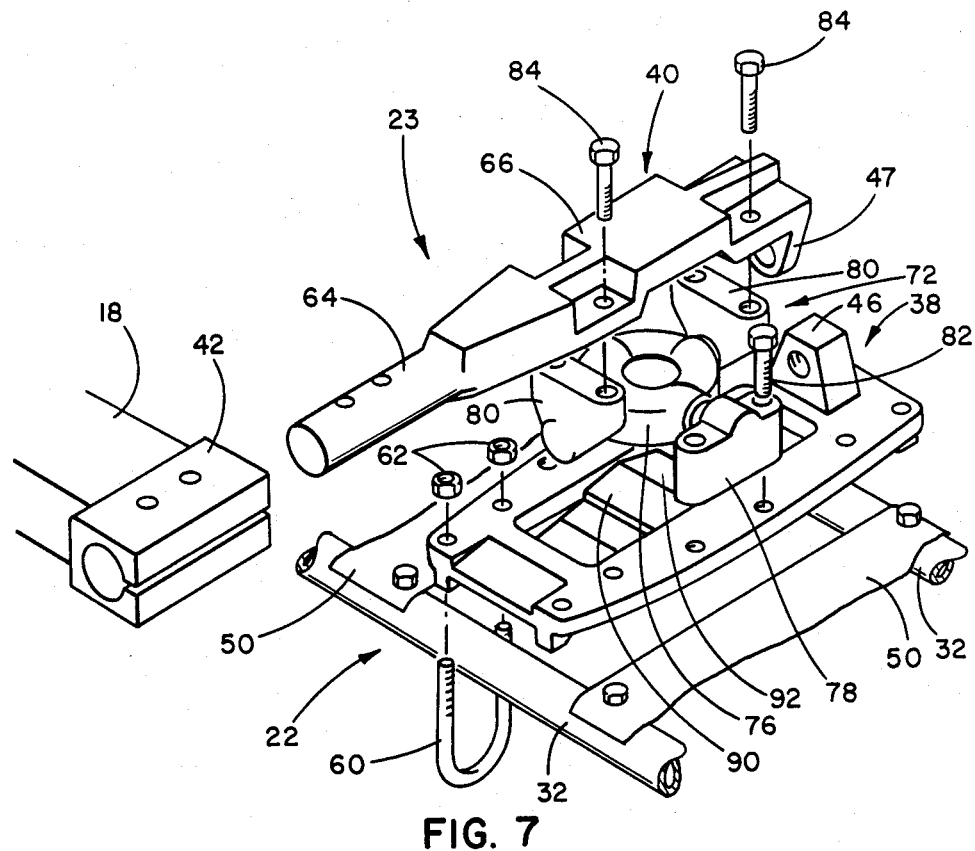
FIG. 7 is an exploded perspective view of the U-joint illustrated in FIG. 6.

FIG. 7 shows an exploded perspective view of U-joint 23. It should be noted that some of the threaded fasteners which are indeed a part of preferred U-joint 23 are omitted from FIG. 7 so that the more important components of the assembly can be more clearly shown. At least one fastener of each type is shown, however, and those skilled in the art will recognize that additional similar fasteners are needed.

Referring again to FIG. 7, four U-bolts 60 are used to connect pivot base plate 38 to spanning tubes 32 of reel unit 22. U-bolts 60 loop under tubes 32 in conventional fashion and the threaded portions of U-bolts 60 are received by hex nuts 62 which bear on the upper surface of pivot base plate 38. Ridges 100, shown in FIG. 8, conform to tubes 32 so that base 38 will not tend to slide atop tubes 32 in the fore-and-aft directions. Plates 50 also ride on the upper surfaces of tubes 32 and butt against pivot base 38.

A cross and bearing assembly 72 is situated between pivot arm 40 and pivot base 38, as shown in FIG. 7. One type of cross and bearing assembly which has been found suitable is the DELTAWING ® X-TRA LIFE universal joint Model Number CP62N-48 sold by Rockwell International, Automotive Operations Division, Troy, Mich. The cross and bearing assembly 72 includes a "cross" 76 centrally located between a pair of diametrically-opposed pitch bearing caps 78 and a pair of diametrically-opposed roll bearing caps 80. Pitch bearing caps 78 are laterally aligned (parallel to the reel axis), and allow cutting unit 22 to pitch upward and downward relative to lift arm 18. Similarly, roll bearing caps 80 are longitudinally aligned (parallel to the normal forward direction of traction vehicle 12) to accommodate rolling or side-to-side tilting of reel unit 22 relative to vehicle 12 and lift arm 18. Pitch bearing caps 78 are bolted to pivot base plate 38 using threaded fasteners 82. Of course, although only one such fastner is shown in FIG. 7, there are actually two fasteners 82 for each pitch bearing cap 78. Pitch bearing caps 78 are drilled through and Pivot base plate 38 is tapped. By contrast, roll bearing caps 80 form threaed holes which are not through-holes. These threaded holes receive threaded bolts 84 which extend through openings in pivot arm body 66.

Figure 8:
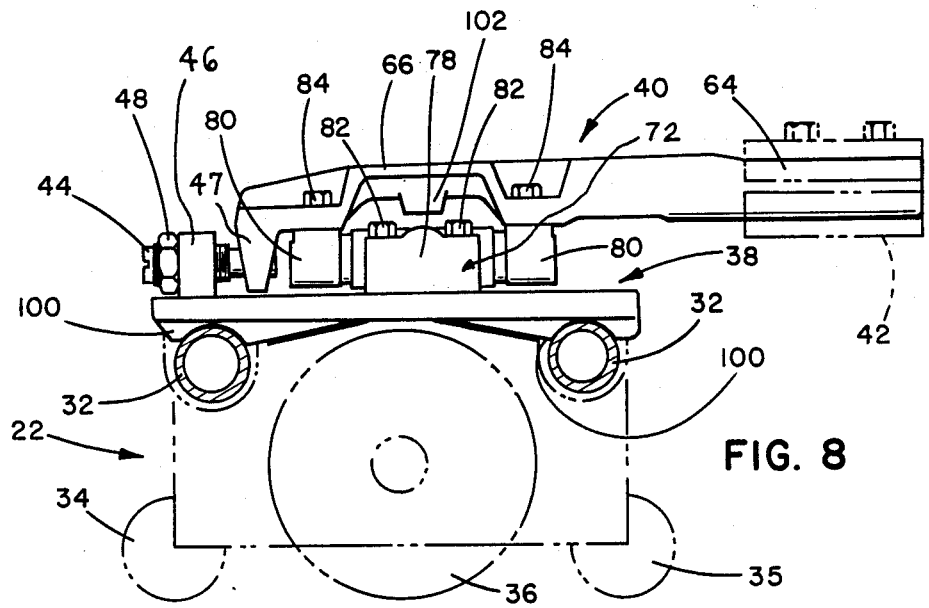
FIG. 8 is a side elevational view of one of the reel units of the turf maintenance machine of FIG. 5.

Thus it can be seen that reel unit 22 can pitch and roll relative to lift arm 18 and vehicle 12. However, these motions must be limited to allow the reel units 22 to be safely lifted into and securely held in their transport positions, among other reasons. To limit the motion of reel unit 22 relative to lift arm 18, a pair of stop means is included in U-joint assembly 23. In particular, pivot base 38 includes roughly at its longitudinal midpoint a ridge-like structure formed by a pair of intersecting inclined planes 90 and 92. Plane 90 forms an upward pitch stop, limiting the upward pitching action of reel unit 22 relative to arm 18; similarly, inclined plane 92 forms a downward pitch stop which limits the downward pitching of reel unit 22 relative to lift arm 18. Stops 90 and 92 act on cross 76, not on bearing caps 78, 80. Pitch stops 90 and 92 allow for 30 degrees of pitch, 15° forward and 15° backward. Functionally equivalent roll stops 102, one of which is shown in FIG. 8, are formed on the underside of pivot arm body 66 and centrally positioned above cross 76 when U-joint 23 is assembled. That is, a pair of inclined planes 102 form a crest or peak and act as roll stops in the nature of the inclined planes 90 and 92 forming the pitch stops. It should be noted, however, that the right and left roll stops 102 formed by the underside of pivot arm body 66 are in effect at right angles to the inclined planes 90 and 92. When the cutting unit 22 rolls or pivots side-to-side, the upper laterally-aligned bulbous portions of cross 76 will contact the right and left roll stops 102 to limit this degree of freedom. Roll stops 102 formed by the underside of body 66 allow for 60 total degrees of roll relative to lift arm 18, 30° right and 30° left. Of course, as noted above, pitching of cutting unit 22 relative to pivot arm 18 can be eliminated altogether by extending lock pin 44 into lock pin receiving block 47 which depends from pivot arm 40.

The general operation of turf maintenance machine 10 is well known to those skilled in the art. U-joint 23 is substantially a passive component that does not require controlling or intervention by the operator. Lock pin 44 and lock pin jam nut 48 must occasionally be manipulated to either eliminate or accommodate pitching of the reel units 22, 24 relative to their lift arms 18.

It should be noted that pivot arm 40 is preferably forged A4140 steel quenched and tempered to 241-285BHN. Tensile requirements are 130,000 PSI ultimate strength, 110,000 PSI yield strength with 18% elongation. The length of pivot arm 40 is preferably about 15 inches. The diameter of extension 64 is preferably about 1.25 inch. Base 38 can be cast ductile iron, grade 7003 (100-70-03) Type G, 241-302 BHN, 3.90-3.50 BID per SAE J434 spec.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the apparatus and method recited in the following claims, and equivalents thereto.

We claim:

1. In a turf maintenance machine having a traction unit, a reel unit, and a lift arm pivotally extending from the traction unit, means for connecting the lift arm and the reel unit comprising a U-joint suitable for allowing a limited pitch and roll of the reel unit relative to the lift arm, while not allowing yaw relative to the lift arm, wherein:
   (a) the U-joint comprises a pivot base suitable for connection to the reel unit; a pivot arm suitable for connection to the lift arm; a cross; and four bearing caps rotatably connected to the cross, wherein two diametrically-opposed pitch bearing caps are attached to the pivot base and two diametrically-opposed roll bearing caps are attached to the pivot arm, whereby the pivot base and the reel unit can pitch and roll relative to the lift arm and the turf maintenance machine, but wherein yaw of the reel unit is prevented;
   (b) the surface of the pivot arm proximate the cross and the bearing caps forms a pair of roll stops suitable for limiting the rolling of the reel unit relative to the lift arm; and
   (c) the surface of the pivot base proximate the cross and the bearing caps forms a pair of pitch stops suitable for limiting pitching of the reel unit relative to the lift arm, wherein the roll stops and the pitch stops act on the cross to limit the motions of the pivot arm and the pivot base, respectively, relative to the cross.

2. The connecting means of claim 1, wherein the pitch stops comprise a pair of inclined pitch planes which meet to form a ridge-like pitch stop structure; and wherein the roll stops comprise a pair of roll planes which converge to form a ridge-like roll stop structure.

3. The connecting means of claim 2, wherein the pitch stops allow about 30 total degrees of pitch, and wherein the roll stops allow about 60 total degrees of roll.

4. In a turf maintenance machine having a traction unit, a reel unit, and a lift arm pivotally extending from the traction unit, means for connecting the lift arm and the reel unit comprising a U-joint suitable for allowing limited pitch and roll of the reel unit relative to the lift arm, while not allowing yaw relative to the lift arm, wherein the U-joint comprises:
   (a) a pivot base suitable for connection to the reel unit; a pivot arm suitable for connection to the lift arm; a cross; and four bearing caps rotatably connected to the cross, wherein two diametrically-opposed pitch bearing caps are attached to the pivot base and two diametrically-opposed roll bearing caps are attached to the pivot arm, whereby the pivot base and the reel unit can roll and selectively pitch relative to the lift arm and the turf maintenance machine, but wherein yaw of the reel unit is prevented; and
   (b) a threadedly apertured first block extending upward from the pivot base, an apertured second block extending downward from the pivot arm, and a lock pin suitable for threadedly engaging the first block and for selectively engaging the second block, wherein when the lock pin is manipulated to engage the first and second blocks the reel unit can only roll relative to the lift arm, and when the lock pin is manipulated so as to not engage the second block the reel unit can pitch and roll relative to the lift arm.

5. In a turf maintenance machine having a traction unit, a reel unit, and a lift arm pivotally extending from the traction unit, a U-joint for connecting the lift arm and the reel unit, comprising:
   (a) a cast iron pivot base suitable for connection to the reel unit;
   (b) a threadedly apertured first block extending upward from the pivot base;
   (c) a forged steel pivot arm suitable for connection to the lift arm;
   (d) an apertured second block extending downward from the pivot arm;
   (e) a pair of diametrically-opposed pitch bearing caps attached to the pivot base;
   (f) a pair of diametrically-opposed roll bearing caps attached to the pivot arm;
   (g) a cross pivotally attached to the pitch and roll bearing caps, whereby the pivot base and the reel unit can pitch and roll relative to the lift arm and the turf maintenance machine, but whereby yaw of the reel unit is prevented;
   (h) a pair of roll stops extending downward from the pivot arm suitable for limiting the rolling of the reel unit relative to the lift arm to about 60 total degrees;
   (i) a pair of pitch stops extending upward from the pivot base suitable for limiting pitching of the reel unit relative to the lift arm to about 30 total degrees, wherein the roll and pitch stops act on the cross to limit the motions of the pivot arm and the pivot base, respectively, relative to the cross; and
   (j) a lock pin suitable for threadedly engaging the first block and for selectively engaging the second block, wherein when the lock pin is manipulated to engage the first and second blocks the reel unit can only roll relative to the lift arm, and when the lock pin is manipulated so as to not engage the second block the reel unit can pitch and roll relative to the lift arm.

6. A turf maintenance apparatus comprising:
   (a) a traction unit;
   (b) a reel unit;
   (c) a lift arm pivotally connected to the traction unit; and
   (d) a U-joint coupling between the reel unit and the lift arm suitable for allowing limited pitch and roll of the reel unit relative to the lift arm, while not allowing reel unit yaw relative to the lift arm, wherein the U-joint comprises:

(i) an cast iron pivot base suitable for connection to the reel unit;
(ii) a threadedly apertured first block extending upward from the pivot base;
(iii) a forged steel pivot arm suitable for connection to the lift arm;
(iv) an apertured second block extending downward from the pivot arm;
(v) a pair of diametrically-opposed pitch bearing caps attached to the pivot base;
(vi) a pair of diametrically-opposed roll bearing caps attached to the pivot arm;
(vii) a cross pivotally attached to the pitch and roll bearing caps, whereby the pivot base and the reel unit can pitch and roll relative to the lift arm and the turf maintenance machine, but whereby yaw of the reel unit is prevented;
(viii) a pair of roll stops extending downward from the pivot arm suitable for limiting the rolling of the reel unit relative to the lift arm to about 60 total degrees;
(ix) a pair of pitch stops extending upward from the pivot base suitable for limiting pitching of the reel unit relative to the lift arm to about 30 total degrees, wherein the roll and pitch stops act on the cross to limit the motions of the pivot arm and the pivot base, respectively, relative to the cross; and
(x) a lock pin suitable for threadedly engaging the first block and for selectively engaging the second block, wherein when the lock pin is manipulated to engage the first and second blocks the reel unit can only roll relative to the lift arm, and when the lock pin is manipulated so as to not engage the second block the reel unit can pitch and roll relative to the lift arm.

* * * * *